UNITED STATES PATENT OFFICE.

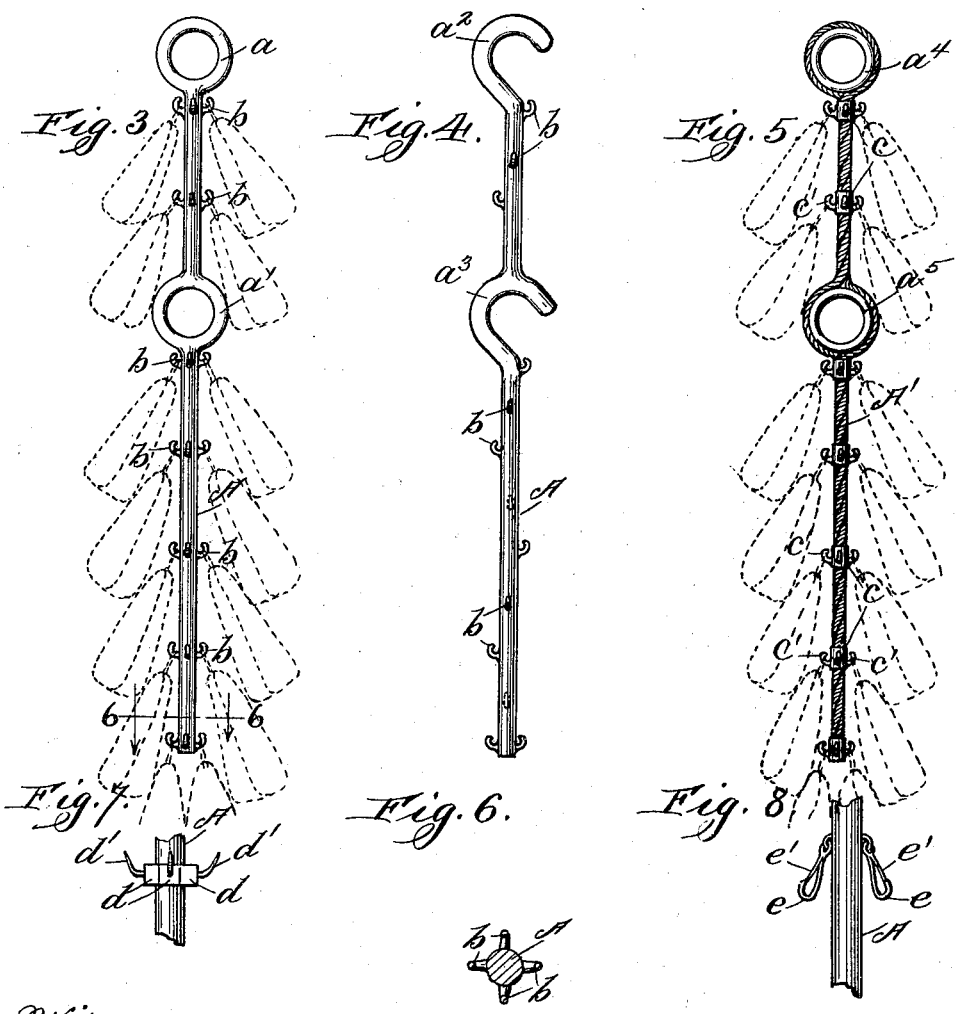

JOHN J. FITZGERALD, OF CHICAGO, ILLINOIS, ASSIGNOR TO THE FITZGERALD MEAT TREE COMPANY, OF SAME PLACE.

MEAT-TREE.

SPECIFICATION forming part of Letters Patent No. 628,784, dated July 11, 1899.

Application filed December 27, 1897. Serial No. 663,686. (No model.)

*To all whom it may concern:*

Be it known that I, JOHN J. FITZGERALD, a citizen of the United States, residing at Chicago, in the county of Cook and State of Illinois, have invented certain new and useful Improvements in Meat-Trees, of which the following is a specification.

This invention relates to improvements in devices to be used for handling and hanging fresh, dried, or smoked meats; and it consists in certain peculiarities of the construction, novel arrangement, and operation of the various parts thereof, as will be hereinafter more fully set forth and specifically claimed.

Heretofore it has generally been the custom in transporting or shipping meat by large slaughtering and packing establishments to either pack the meat—such as hams, shoulders, sides, and the like—in boxes or barrels or to pile it up on the floors of the cars, which method of shipping is objectionable for the reason that when thus packed or piled up in the cars the meat becomes compressed, misshapen, and otherwise deleteriously affected. Besides, it is often damaged by rats, which can easily attain access thereto by reason of the position it occupies in the cars. When piled up loosely in the cars, it is evident that each piece of meat must be separately handled, which requires a great deal of time and much labor.

In smoking or chilling meats it has generally been customary to hang the pieces separately, or one at a time, on rafters, beams, or other supports, which also is a tedious and slow manner of handling the same.

It is therefore the object of my invention, first, to provide a meat-tree or device for handling and hanging a number of pieces of meat at one time and by the use of the same implement which shall be simple and inexpensive in construction, strong, durable, and effective in operation; second, such a device which when loaded with meat may be easily transferred from one point to another and securely suspended within the freight-car or other place out of reach of rats or other animals, and, third, a meat tree or hanger which will support the pieces of meat suspended thereon in such a manner as to admit of perfect ventilation, or when used for chilling the meat will hold the pieces sufficiently apart to expose almost the entire surface of each piece.

In order to enable others skilled in the art to which my invention pertains to make and use the same, I will now proceed to describe it, referring to the accompanying drawings, in which—

Figure 1 is a view in elevation and partly in section showing a portion of a packing-house, freight-car, and a track leading from one to the other and illustrating the manner of transporting a number of pieces of meat on my tree or hanger from the packing-house to the car and showing one of the loaded trees suspended within the car. Fig. 2 is a detached perspective view of a roller-hook used for conveying the hanger on the track from the house to the car. Fig. 3 is a view in elevation of one of my hangers. Figs. 4 and 5 are similar views of modifications thereof. The pieces of meat or hams are indicated in dotted lines. Fig. 6 is an enlarged cross-sectional view taken on line 6 6 of Fig. 3, and Figs. 7 and 8 are fragmental views illustrating other modifications in the construction of the suspending-hooks.

Similar letters refer to like parts throughout the different views of the drawings.

A represents the supporting-piece or body of my tree or hanger, which may be made of any suitable material, but usually metal, and of any desired dimensions. The upper end of the piece is provided with a ring or opening $a$, and some distance below said ring is located another one, $a'$, the two rings affording openings in the upper portion of the supporting-piece for the reception, respectively, of a sustaining-hook and a rod or bar to be used for transferring the tree when loaded, as will be presently explained.

Arranged at proper points on the supporting-piece or body A and usually in groups of four (see Figs. 3 and 6) are a number of hooks $b$, which have their free ends rounded and turned inwardly toward the piece A in order to prevent the strings or cords by means of which the pieces of meat are hung on said hooks slipping therefrom. The hooks $b$ may be made integral with the piece A, as shown in Figs. 3 and 6, or may be riveted or otherwise secured thereto.

In Fig. 4 of the drawings I have shown a modification in the construction of the supporting-piece A and in the arrangement of the hooks $b$ thereon, which consists in forming or providing the upper end of the piece or body A with a curved portion $a^2$, and at some distance below said curved portion another curved part $a^3$, which curved parts form part of an opening or circle, as shown in the drawings, and are for the reception of a sustaining hook and rod or bar to be used for moving the tree when loaded, as in the construction illustrated in Fig. 3 of the drawings.

In Fig. 5 I have shown the supporting-piece or body made of a piece of rope A′ and provided at its top with a ring $a^4$ and some distance therebelow another ring $a^5$, for the purposes above set forth. On the rope is secured at proper points a series of blocks $c$, each having thereon a number of hooks $c'$, on which the pieces of meat may be hung. The blocks $c$ may be clamped on or riveted to the rope forming the body or supporting-piece, or the hooks $c'$ may be secured thereto in any desired manner.

Figure 7 represents another modification in the construction of the supporting-piece or body and of the hooks, which consists in securing to the body A or making integral therewith at proper points thereon a number of blocks or projections $d$, having in their outer portions upturned spikes or hooks $d'$, standing beyond the periphery of the body and upon which the pieces of meat may be impaled.

In the construction illustrated in Fig. 7 the blocks or projections $d$ will serve to hold the pieces of meat apart, and thus render the tree when so constructed especially useful for chilling meats.

In Fig. 8 I have illustrated still another modification of the hooks, which I may sometimes employ and which consists in loosely securing on the body A at proper points a series of hooks $e$, each having a spring-tongue $e'$ to engage the free end of the hook, thus affording snap-hooks for the pieces of meat. It is apparent that the body or supporting-piece of the tree may be made of rope, leather, wood, or metal, and I therefore do not desire to be limited to any specific material; but when a rope or other flexible material is employed the portion thereof between the rings or openings in the upper portion should be stiffened in a suitable manner, and the blocks are especially useful in this construction. In any case, however, care must be taken that the hooks or group of hooks above hang in such relation to the hooks or group below that the pieces of meat suspended on the former will rest against the outer faces of the pieces suspended on the latter and will incline outwardly from the body or supporting-piece sufficiently to leave a vertical opening alongside said body, interrupted only by said strings by which the meat is attached to the hooks, and through this opening there is obviously permitted a free circulation of air or current of liquid. Also the hooks just above the ring or opening through which the rod or bar is passed are sufficiently elevated therefrom to permit the free passage of said rod or bar without necessarily disturbing the arrangement and location of said pieces of meat.

The operation of my device is simple and as follows: When it is desired to transfer a quantity of meat from one point to another, as from the packing-house C to the car D, which are represented in Fig. 1 of the drawings as being connected by means of an elevated rail E, the pieces of meat are secured on the hooks of the body of the tree, when by passing a rod, bar, or hand-spike through the opening near the middle of the body the tree may be lifted and secured at its upper end on the hook $f$, which is provided with a grooved roller F, which roller operates on the inclined rail E and will convey the loaded tree to the end of the rail adjacent to the car, when it may be removed therefrom by again placing a bar or rod within the opening of the body near its middle and lifting the upper ring or opening from the hook $f$ and then carrying it into the car, where it may be suspended by means of the last-named ring or opening on one of the hooks $g$, secured on the rafters of the car.

When the device is used for suspending the meat to be chilled, one piece of meat only will be placed on each of the hooks.

Having thus fully described my invention, what I claim as new, and desire to secure by Letters Patent, is—

1. The herein-described meat-tree comprising a continuous supporting-piece or body provided at its upper end with means for engaging a support, and on its body a series of hooks arranged in groups, the latter being so spaced that the meat hanging on the hooks of any one group will rest against that on the hooks of the group next below and will incline outwardly from the body so as to leave an upright passage near the same and facilitate circulation, substantially as set forth.

2. The herein-described meat-tree comprising a supporting-piece or body provided at its upper end with means for engaging a support, a ring or opening in the body below said means for the reception of a transverse rod or bar for lifting or transporting said tree, and on said body above and below the ring a series of hooks so arranged that the meat hanging on the hook next above said ring will permit the free passage of the bar therethrough, substantially as set forth.

JOHN J. FITZGERALD.

Witnesses:
CHAS. C. TILLMAN.
E. A. DUGGAN.